United States Patent
Sugawara

(10) Patent No.: US 6,971,601 B2
(45) Date of Patent: Dec. 6, 2005

(54) SPINNING REEL SOUND PRODUCING MECHANISM

(75) Inventor: Ken'ichi Sugawara, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/784,956

(22) Filed: Feb. 25, 2004

(65) Prior Publication Data
US 2004/0178290 A1    Sep. 16, 2004

(30) Foreign Application Priority Data
Mar. 14, 2003   (JP)   ............................. 2003-070183

(51) Int. Cl.[7] .......................................... A01K 89/02
(52) U.S. Cl. ..................................... 242/307; 242/246
(58) Field of Search .................. 242/305–307, 242/246

(56) References Cited

U.S. PATENT DOCUMENTS

| | | | | |
|---|---|---|---|---|
| 4,173,317 A | * | 11/1979 | Hamayasu et al. | 242/306 |
| 4,549,702 A | * | 10/1985 | Councilman | 242/246 |
| 5,279,477 A | * | 1/1994 | Yoshikawa | 242/306 |
| 6,688,545 B2 | * | 2/2004 | Kitajima et al. | 242/306 |
| 2003/0136866 A1 | * | 7/2003 | Kitajima et al. | 242/307 |
| 2004/0041045 A1 | * | 3/2004 | Sugawara | 242/307 |

FOREIGN PATENT DOCUMENTS

JP   2003-345368 A   12/2002

* cited by examiner

Primary Examiner—Emmanuel Marcelo
(74) Attorney, Agent, or Firm—Shinjyu Global IP Counselors, LLP

(57) ABSTRACT

A sound producing mechanism for a spinning reel includes a first sound producing portion that is coupled to a spool shaft and has an attachment portion and a plurality of saw tooth portions that are formed in a saw tooth shape circumferentially apart on an outer peripheral surface of the attachment portion; and a second sound producing portion that is attached to the spool and includes a pawl member that repeatedly comes into contact with the saw tooth portions to produce sound. The first sound producing portion is mounted to the spool shaft so as to be unrotatable when the spool rotates in a line releasing direction and rotatable when the spool rotates in a line winding direction. The pawl member is urged toward the saw tooth portions by a spring member. The spinning reel sound producing mechanism produces sound only when the spool rotates in the line releasing direction.

16 Claims, 6 Drawing Sheets

SPINNING REEL SOUND PRODUCING MECHANISM

BACKGROUND OF THE INVENTION

1. Field of the Invention

The present invention generally relates to a spinning reel sound producing mechanism. More specifically, the present invention relates to a spinning reel sound producing mechanism that produces sound by relative rotation between a spool shaft and a spool that winds up and releases fishing line.

2. Background Information

A spinning reel generally includes a reel unit that rotatively supports a handle, a rotor, and a spool that is rotatably mounted to a spool shaft. The spool of the spinning reel is movable back and forth with respect to the reel unit, and includes a bobbin portion onto the outer circumference of which fishing line is wound, and a larger diameter skirt portion provided at a rear end of the bobbin portion. Additionally, a spool mount is disposed on the rear end portion of the bobbin portion and is non-rotatably coupled to the spool shaft to restrict rearward movement of the spool. The interior of the bobbin portion of a front drag type spinning reel includes a drag mechanism having a plurality of drag plates and a sound producing mechanism for producing sound when the drag mechanism operates, as shown in, for example, Japanese Patent Application Publication No. 2002-345368.

This kind of sound producing mechanism is, for example, disposed in the interior of the drag mechanism, and includes a spring member that is non-rotatably mounted on the spool shaft, and a cylindrical member that makes contact with the spring member and produces sound. The cylindrical member is mounted on the inner peripheral portion of the bobbin portion, and produces sound when the spring member makes contact with corrugated portions formed on the inner peripheral side of the cylindrical member by relative rotation between the cylindrical member and the spring member.

In addition, the spool mount that is disposed at the rear end portion of the bobbin portion can also serve as a sound producing mechanism. This kind of sound producing mechanism includes a plate-shaped member made of a synthetic resin and is mounted to the rear end of the bobbin portion, and a disk-shaped member that makes contact with the plate-shaped member to produce sound. The spool shaft is non-rotatively engaged with the inner periphery of the disk-shaped member, corrugated portions are formed on the outer periphery of the disk-shaped member, and the disk-shaped member produces sound when the plate-shaped member makes contact with the corrugated portions by relative rotation between the disk-shaped member and the plate-shaped member.

With the aforementioned conventional spinning reel sound producing mechanism, sound is produced when the drag mechanism operates, i.e. when the spool rotates in the line releasing direction and the plate-shaped member contacts the corrugated portions formed on the outer periphery of the disk-shaped member. Similarly, the sound producing mechanism also produces sound when the spool rotates in a direction opposite to the line releasing direction, i.e. when the spool rotates in the line winding direction.

When a person goes to a shop to buy a fishing reel, he/she often manually rotates the spool relative to the reel unit in both directions and check the sounds in selecting which fishing reel to buy. Accordingly, conventional sound producing mechanism has been designed so that the sound produced when the spool rotates in the line-releasing direction and the sound produced when the spool rotates in the line-guiding direction are similar in volume and quality. However, there is no rotating of the spool relative to the reel unit in the line winding direction during the normal course of fishing, unless the angler manually rotates the spool relative to the reel unit. Thus, an angular will not hear the line-guiding direction sound during the normal course of fishing. In other words, the sound that the sound producing mechanisms produces during the spool's line-guiding direction rotation serves no purpose during the actual use of the fishing reel. Furthermore, experienced anglers know that the spool does not rotate relative to the reel unit in the line-guiding direction during the normal course of fishing, and therefore do not check the line-guiding direction sound when they choose a fishing reel at a shop. Accordingly, the line-guiding direction sound of the sound producing mechanism is becoming more meaningless.

In view of the above, it will be apparent to those skilled in the art from this disclosure that there exists a need for an improved spinning reel sound producing mechanism that overcomes the above-described problems. This invention addresses this need in the art as well as other needs, which will become apparent to those skilled in the art from this disclosure.

SUMMARY OF THE INVENTION

An object of the present invention is to make a sound producing mechanism of a spinning reel that produces sound when the spool rotates in the line releasing direction.

A spinning reel sound producing mechanism according to the first aspect of the present invention is for use in a spinning reel having a reel unit and a spool that is disposed around a spool shaft. A fishing line is wound around and released from the spool. The producing mechanism produces sound by relative rotation between the spool and the reel unit, and includes a first sound producing portion and a second sound producing portion. The first sound producing portion has an attachment portion mounted to one of the spool and the reel unit, and a plurality of saw tooth portions that are formed in a saw tooth shape circumferentially apart on an outer peripheral surface of the attachment portion. The second sound producing portion is mounted to the other of the spool and the reel unit, and has a front end portion that is configured to come into contact with the saw tooth portions of the first sound producing portion. The first sound producing portion is mounted to the one of the spool and the reel unit so as to be rotatable relative to the second sound producing portion when the spool rotates in a line releasing direction and unrotatable when the spool rotates in a line winding direction.

Here, the first sound producing portion is, for example, a one-way ratchet wheel, and formed so as to allow rotation of the spool in the line releasing direction. In other words, because the first sound producing portion is mounted to either the spool or the reel so as to be rotatable when the spool rotates in the line winding direction but unrotatable when the spool rotates in the line releasing direction, the second sound producing portion comes into contact with the first sound producing portion and produces sound only when the spool rotates in the line releasing direction, i.e. only when the drag mechanism operates. In other words, the sound producing mechanism produces sound only when the spool rotates in the line releasing direction, and eliminating the sound produced during the spool's rotation in the line-guiding direction.

The sound producing mechanism according to the second aspect of the present invention is the sound producing mechanism of the first aspect, in which the first sound producing portion is coupled to the spool shaft.

The sound producing mechanism according to the third aspect of the present invention is the sound producing mechanism of the first or second aspect, in which the second sound producing portion is coupled to the spool.

In a front drag type of spinning reel, the sound producing mechanism has the first sound producing portion mounted to the spool shaft and the second sound producing portion mounted to the spool, such that the sound is produced by relative rotation between the spool and the spool shaft. In a rear drag type of spinning reel, the sound producing mechanism has the first sound producing portion mounted to the reel unit and the second sound producing portion mounted to the spool shaft, such that the sound is produced by relative rotation between the spool shaft and the reel unit.

Here, the spinning reel is a front-drag type, and sound is produced by relative rotation between the spool and the spool shaft. In addition, the first sound producing portion is mounted to the spool shaft, while the second sound producing portion is mounted on the spool. Accordingly, because the first sound producing portion is mounted to the spool shaft so as to be unrotatable when the spool rotates in the line releasing direction, the second sound producing portion will come into contact with the first sound producing portion and produce sound only when the drag mechanism operates, i.e. only when the spool rotates in the line releasing direction. In other words, the sound producing mechanism produces sound only when the spool rotates in the line releasing direction, and eliminating the sound produced during the spool's rotation in the line-guiding direction.

The sound producing mechanism according to the fourth aspect of the present invention is the sound producing mechanism of any of the first through third aspect, further including a friction member that is disposed between the first sound producing portion and the one of the spool and the reel unit, to restrict rotation of the first sound producing portion relative to the one of the spool and the reel unit. Here, for example, by mounting the friction member to a groove or the like formed between the first sound producing portion and the spool shaft and restricting the rotation of the first sound producing portion, damage to the first and the second sound producing portions that is caused by contact with the second sound producing portion can be prevented when the spool rotates in the line winding direction.

The sound producing mechanism according to the fifth aspect of the present invention is the sound producing mechanism of the fourth aspect, further including a retaining member that is non-rotatably mounted on the spool shaft and retains a bearing that is disposed on an inner peripheral side of the spool. The first sound producing portion is coupled to the spool shaft, and the friction member is disposed between the first sound producing portion and the retaining member. Here, rotation of the first sound producing portion can be easily restricted by, for example, mounting the friction member to a groove or the like formed in the outer periphery of the retaining member.

The sound producing mechanism according to the sixth aspect of the present invention is the sound producing mechanism of the fifth aspect, in which an inner peripheral surface of the retaining member is formed such that its cross-section is circular, and the spool shaft is formed such that that its cross-section is non-circular. The sound producing mechanism further includes spacer members that are mounted in a gap between the inner peripheral surface of the retaining member and the spool shaft. Here, wobbling of the retaining member can be prevented by mounting, for example, spacer members that have a substantially semi-circular cross-section between the inner peripheral surface of the retaining member and the spool shaft.

The sound producing mechanism according to the seventh aspect of the present invention is the sound producing mechanism of the fifth or sixth aspect, in which an inner diameter of the plurality of saw tooth portions of the first sound producing portion is larger than an outer diameter of the bearing. Here, by forming the plurality of saw tooth portions of the first sound producing portion to have an inner diameter larger than the outer diameter of the bearing, the number of saw tooth portions can be increased and the saw tooth pitch can be narrowed, which thus allows a crisp noise to be produced.

The sound producing mechanism according to the eighth aspect of the present invention is the sound producing mechanism of any of the second through seventh aspects, in which the friction member is an annular member made of an elastic material. Here, by providing a member made of an elastic material such as O-ring, the rotation of the first sound producing portion can be reliably restricted.

The sound producing mechanism according to the ninth aspect of the present invention is the sound producing mechanism of any of the second through eighth aspects, in which the first sound producing portion is a closed end cylindrical member in which the saw tooth portions are provided on the outer peripheral surface of the cylindrical portion. Here, for example, even when a washer or the like is attached/removed inside the spool and the axial position of the spool is shifted, the first and the second sound producing portions can reliably contact each other by providing long saw-tooth portions on the outer peripheral surface of the cylindrical portion.

The sound producing mechanism according to the tenth aspect of the present invention is the sound producing mechanism of any of first through ninth aspects, in which the second sound producing portion includes a pawl member that is pivotably mounted to the spool and the front end of he pawl member can come into contact with the saw tooth portions, and a spring member that urges the front end of the pawl member toward the saw tooth portions. Here, the first and the second sound producing portions can be brought into contact with each other with a simple configuration.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
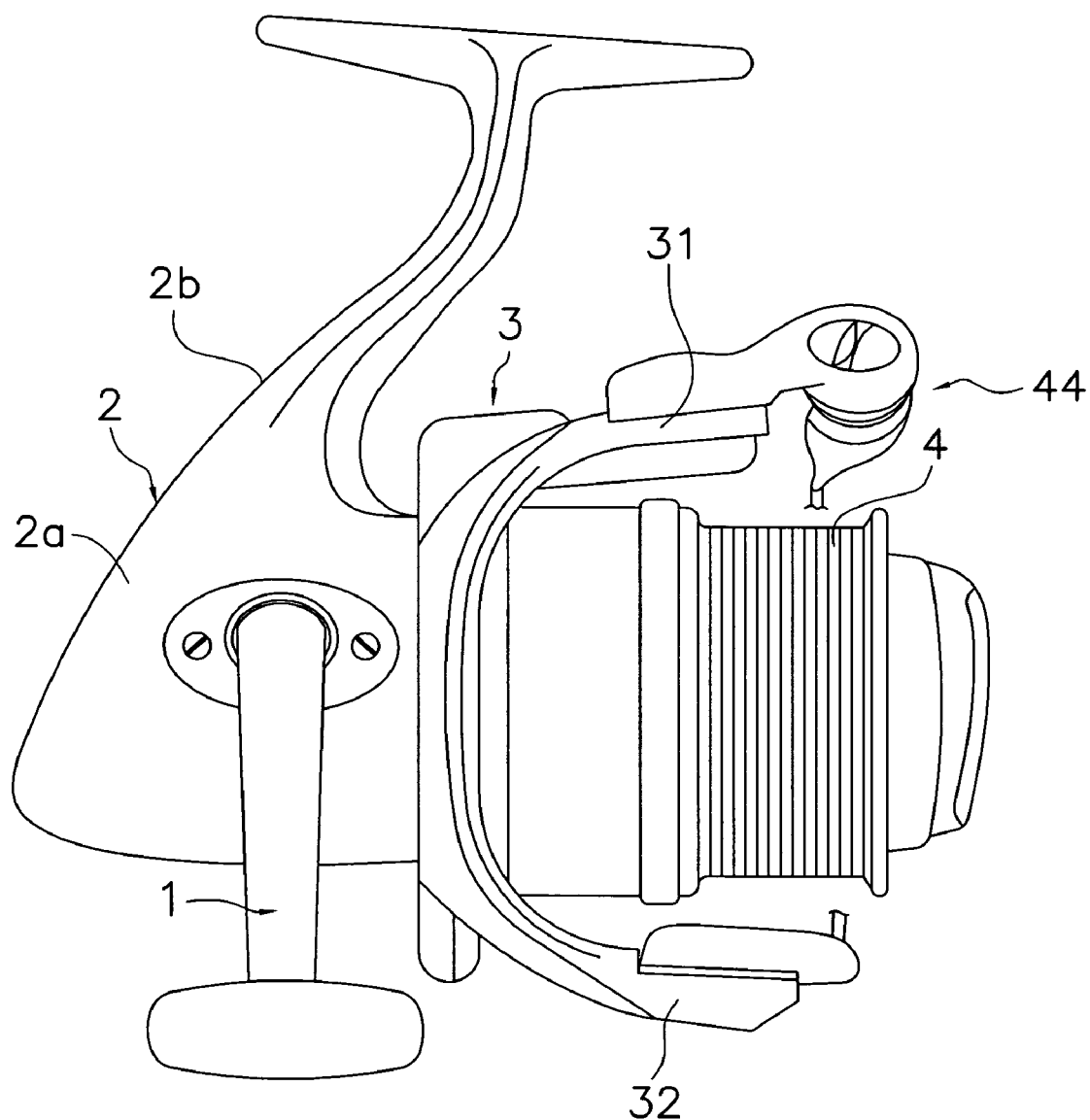
FIG. 1 is a right side view of a spinning reel in accordance with an embodiment of the present invention.

As shown in FIG. 1, a spinning reel according to an embodiment of the present invention includes a reel unit 2 that rotatively supports a handle 1, a reel unit 2, a rotor 3, and a spool 4. The rotor 3 is rotatively supported on the front of the reel unit 2. The spool 4 is for winding fishing line around the outer peripheral surface thereof, and is disposed on the front of the rotor 3 so as to be shifted back and forth.

Reel Unit 2

Figure 2:
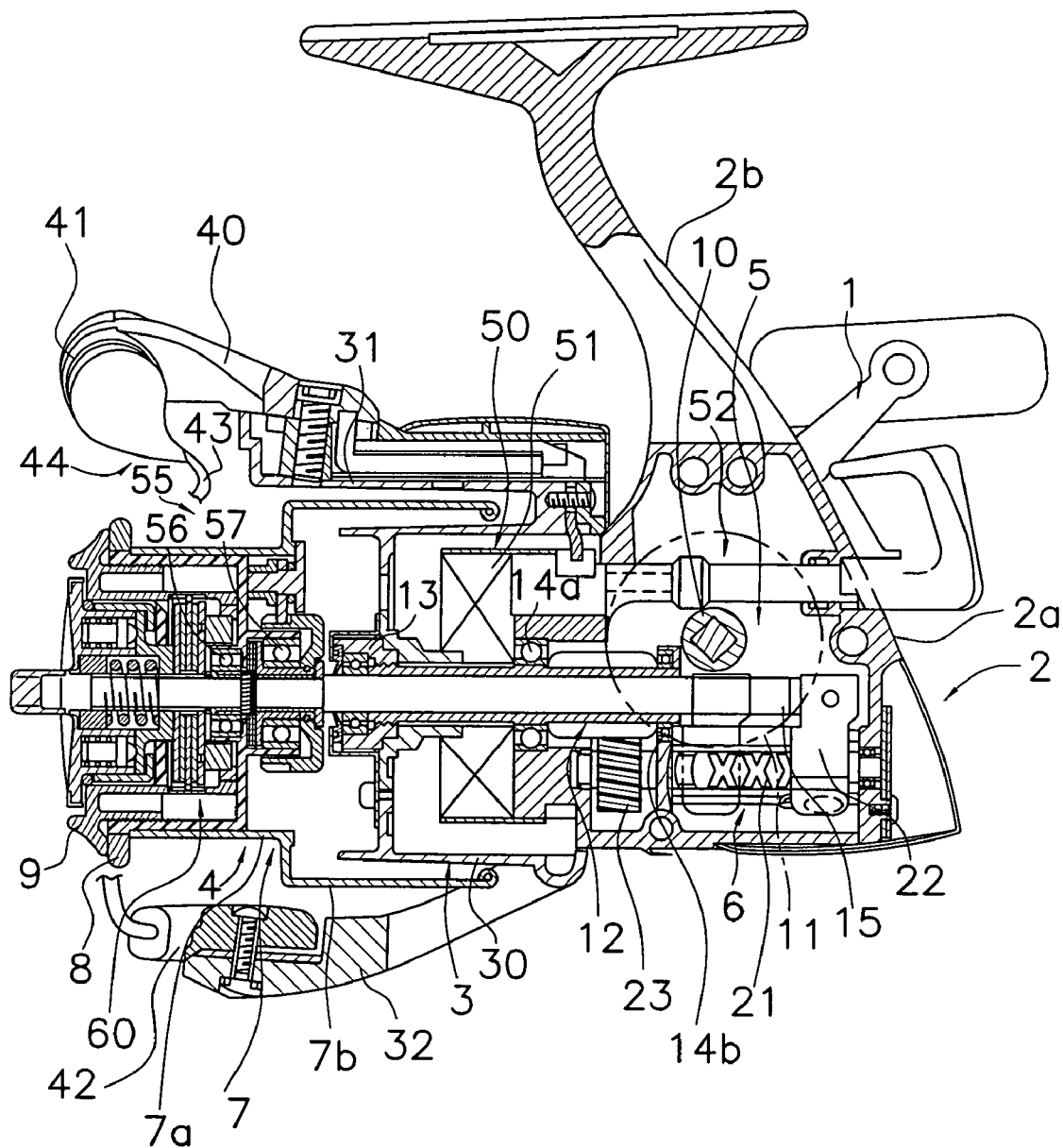
FIG. 2 is a left side cross-sectional view of the spinning reel in accordance with the embodiment of the present invention.

The reel unit 2 includes a reel body 2a, and a rod attachment leg 2b that extends diagonally upward and forward from the reel body 2a. As shown in FIG. 2, the reel body 2a includes an interior space, and provided within the space are a rotor drive mechanism 5 for rotating the rotor 3 in cooperation with rotation of the handle 1, and an oscillating mechanism 6 for moving the spool 4 back and forth to wind fishing line uniformly onto the spool 4.

The rotor drive mechanism 5 includes a face gear 11 that rotates together with a handle shaft 10 onto which the handle 1 is fixedly coupled, and a pinion gear 12 that meshes with the face gear 11. The pinion gear 12 is formed in a hollow tubular shape, and the front portion of the pinion gear 12 extends through the center portion of the rotor 3 and is fixedly coupled to the rotor 3 with a nut 13. In addition, the middle and the rear end portions of the pinion gear 12 are rotatively supported on the reel unit 2 via bearings 14a, 14b respectively.

The oscillating mechanism 6 serves to move the spool shaft 15 which is connected to the central portion of the spool 4 forward and backward via a drag mechanism 60. The oscillating mechanism 6 also moves the spool 4 in the same direction. The oscillating mechanism 6 includes a worm 21 disposed below and parallel to the spool shaft 15, a slider 22 that moves back and forth along the worm 21, and an intermediate gear 23 fixedly coupled to the front end of the worm 21. A rear end of the spool shaft 15 is non-rotatably and fixedly coupled to the slider 22. The intermediate gear 23 meshes with the pinion gear 12.

The reel unit, rotor drive mechanism, and oscillating mechanism are conventional components that are well known in the art. Accordingly, their structures will not be discussed or illustrated in detail herein.

Rotor 3

As shown in FIG. 2, the rotor 3 includes a cylindrical portion 30, and a first rotor arm 31 and a second rotor arm 32 arranged opposite to each other on the sides of the cylindrical portion 30. The cylindrical portion 30, the first rotor arm 31 and the second rotor arm 32 are, for example, formed unitarily from an aluminum alloy.

A first bail support member 40 is pivotably mounted to the outer peripheral side of the front end of the front end of the first rotor arm 31. A line roller 41 for guiding fishing line to the spool 4 is mounted to the front end of the first bail support member 40. In addition, a second bail support member 42 is pivotably mounted to an inner peripheral side of the front end of the second rotor arm 32.

A bail 43 that is a wire member bent approximately into a U-shape is fixedly held between the line roller 41 and the second bail support member 42. The first and the second bail support members 40 and 42, the line roller 41 and the bail 43 together make up a bail arm 44 that guides the fishing line to the spool 4. The bail arm 44 can pivot between a line-guiding posture shown in FIG. 2 and a line-releasing posture which flips from the line-guiding posture.

A reverse rotation check mechanism 50 for blocking and releasing reverse rotation of the rotor 3 is disposed in the interior of the cylindrical portion 30 of the rotor 3. As shown in FIG. 2, the reverse rotation check mechanism 50 includes a roller-type one-way clutch 51 having a freely rotating inner ring, and a switching mechanism 52 for switching the one-way clutch 51 between an operating state (in which reverse rotation is not possible) and a non-operating state (in which reverse rotation is possible).

The rotor and reverse rotation check mechanism are conventional components that are well known in the art. Accordingly, their structures will not be discussed or illustrated in detail herein.

Spool 4

Figure 3:
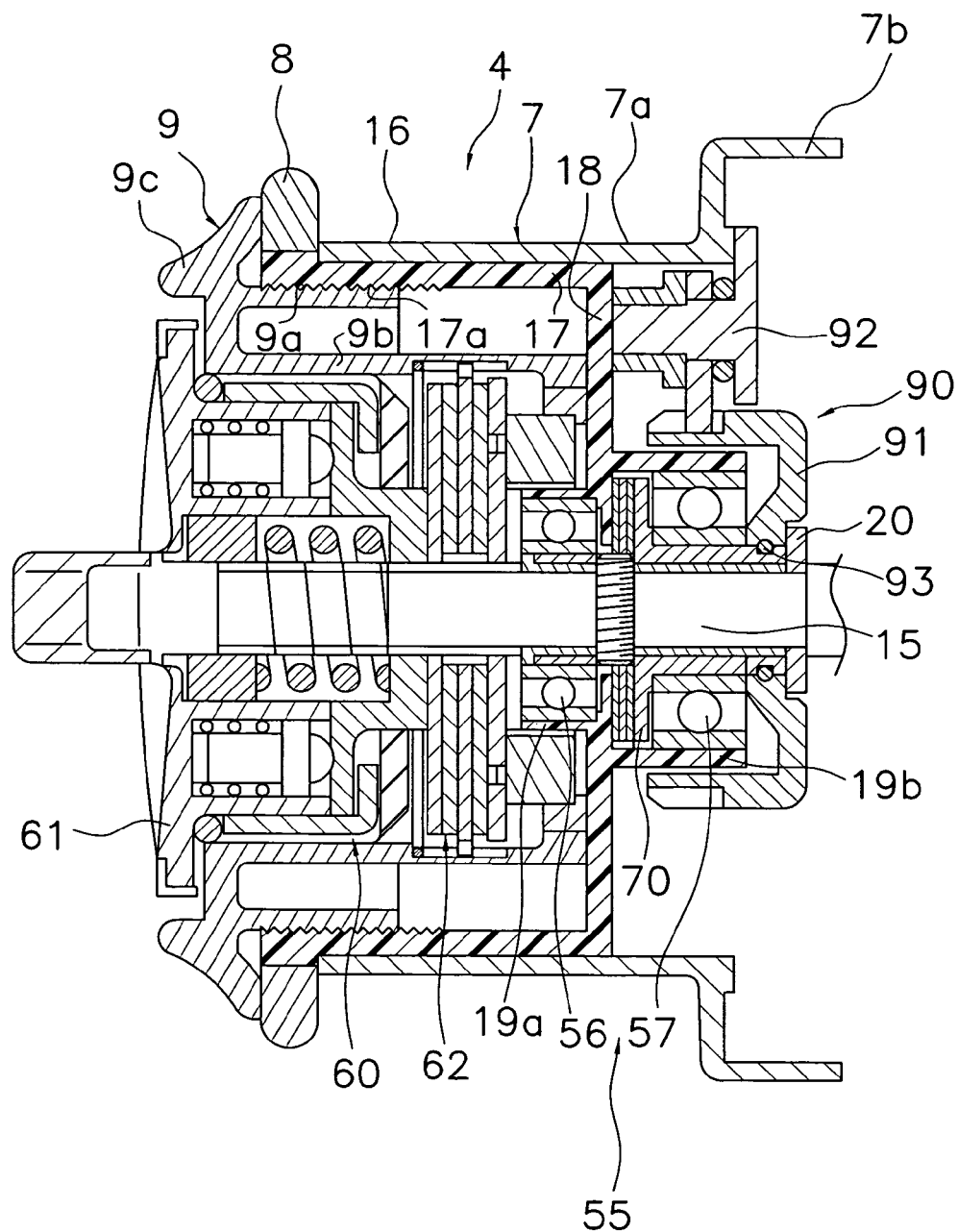
FIG. 3 is an enlarged cross-sectional view of a spool of the spinning reel in accordance with an embodiment of the present invention.

As shown in FIG. 2, the spool 4 is disposed between the first rotor arm 31 and second rotor arm 32 of the rotor 3, and is mounted to the front end of the spool shaft 15 with the drag mechanism 60 interposed therebetween. As shown in FIG. 3, the spool 4 includes a cylindrical spool unit 7 with two large/small levels and around the outer periphery of which fishing line is wound, a large diameter flange portion 8 that is mounted on the front end of the spool unit 7, and a flange fixing member 9 that fixedly couples the flange portion 8 to the spool unit 7.

As shown in FIG. 3, the spool unit 7 in this embodiment is a cylindrical member having two large/small levels that is manufactured by press working (such as drawing) an aluminum alloy, and is rotatively mounted on the spool shaft 15 through a first bearing 56 and a second bearing 57. The spool unit 7 includes a cylindrical bobbin portion 7a, around the outer periphery of which fishing line is wound, and a large diameter tubular skirt portion 7b that is unitarily formed with the rear portion of the bobbin portion 7a.

As shown in FIG. 3, the bobbin portion 7a includes a tubular portion 16 that is formed from sheet metal into a tubular shape, a synthetic resin cylindrical portion 17 that is a separate member and is attached to the inner peripheral side of the tubular portion 16, and an annular inner peripheral portion 18 that is unitarily formed with the cylindrical portion 17 on the rear end of the cylindrical portion 17. As shown in FIG. 3, a threaded portion 17a for mounting the flange fixing member 9 is formed in the inner peripheral surface of the tubular portion 17. Closed end cylindrical support portions 19a and 19b are respectively formed on the front and the rear of the inner side of the inner peripheral portion 18. The first bearing 56 and the second bearing 57 are mounted on the inner peripheral sides of the support members 19a and 19b, and the first bearing 56 and the second bearing 57 are rotatively mounted on the spool shaft 15 via a tubular retaining member 70. An annular member 20 is in contact with the rear end of the retaining member 70 and is mounted to restrict the rearward movement of the retaining member 70. Furthermore, a sound producing mechanism 90 that includes a first sound producing portion 91 and a second sound producing portion 92 (described later) that produce sound by relative rotation between the spool 4 and the spool shaft 15, and a friction member 93 are mounted on the rear end of the bobbin portion 7a.

Figure 4:
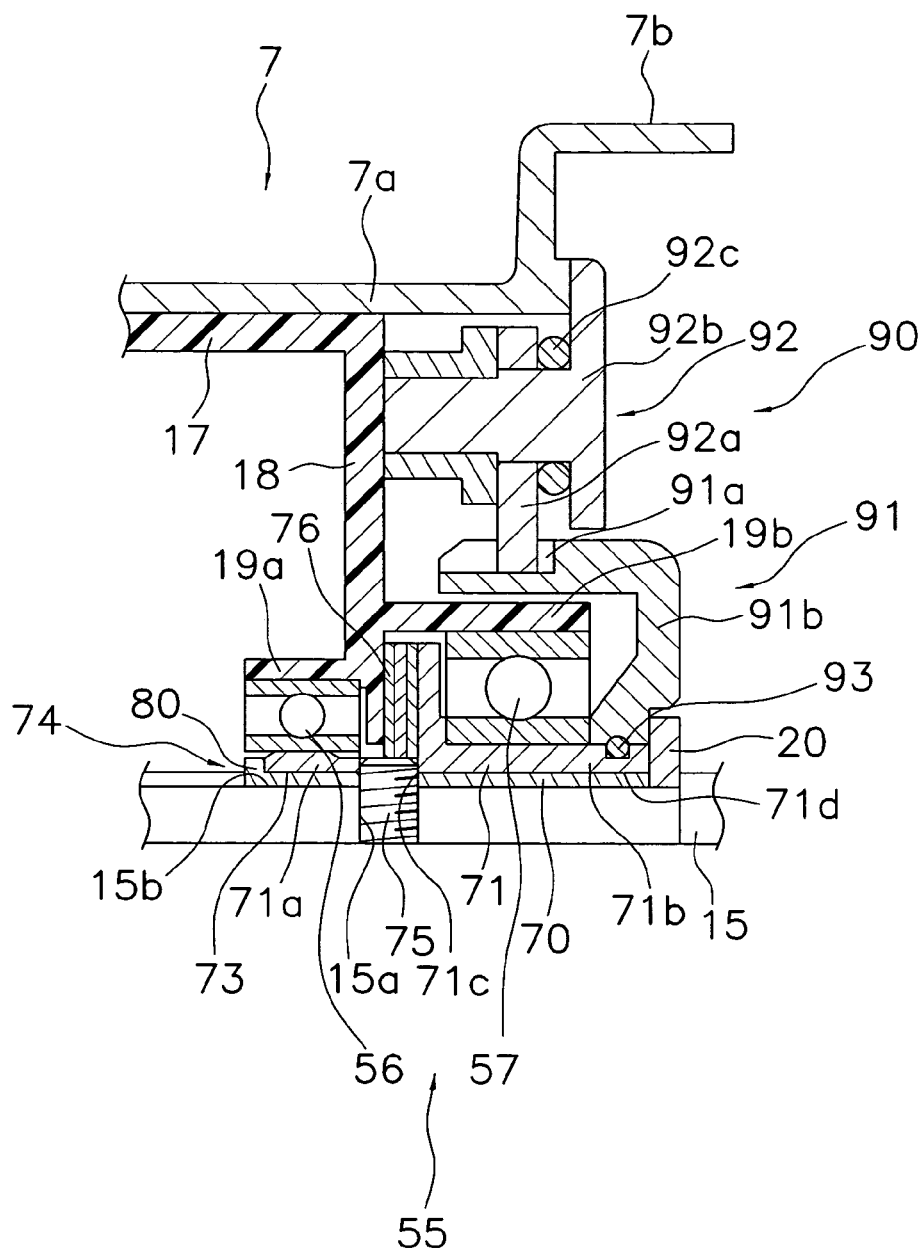
FIG. 4 is an enlarged cross-sectional view of a sound producing mechanism of the spool in accordance with an embodiment of the present invention.

As shown in FIG. 4, the annular member 20 is a metal ring member that is mounted on the spool shaft 15 and is not movable back and forth on the spool shaft 15. The annular member 20 is in contact with the rear end of the second bearing 57. By fixedly attaching the annular member 20 to the spool shaft 15, the entire spool 4 can be accommodated on the spool shaft 15 even if the inner peripheral portion 18 is pushed rearward (toward the reel unit 2) by the drag mechanism 60.

As shown in FIG. 4, the rear end portion of the retaining member 70 is in contact with the annular member 20, and the retaining member 70 is a tubular member that is pushed rearward by the inner peripheral portion 18. The first bearing 56 and the second bearing 57 are retained on the outer periphery of the retaining member 70, and the inner periphery of the retaining member 70 is non-rotatively mounted to the spool shaft 15. The retaining member 70 includes a cylindrical portion 71 whose inner periphery is non-rotatively mounted to the spool shaft 15, and a disk portion 72 that is arranged on the outer periphery of the cylindrical portion 71. The front side surface of the disk portion 72 is pressed by the inner peripheral portion 18. The cylindrical portion 71 includes a first cylindrical portion 71a and a second cylindrical portion 71b. The first cylindrical portion 71a is arranged on the front side of the disk portion 72, and the first bearing 56 is disposed on the outer periphery of the first cylindrical portion 71a. The second cylindrical portion 71b is arranged on the rear side of the disk portion 72, and the second bearing 57 is disposed on the outer periphery of the second cylindrical portion 71b.

Figure 6:
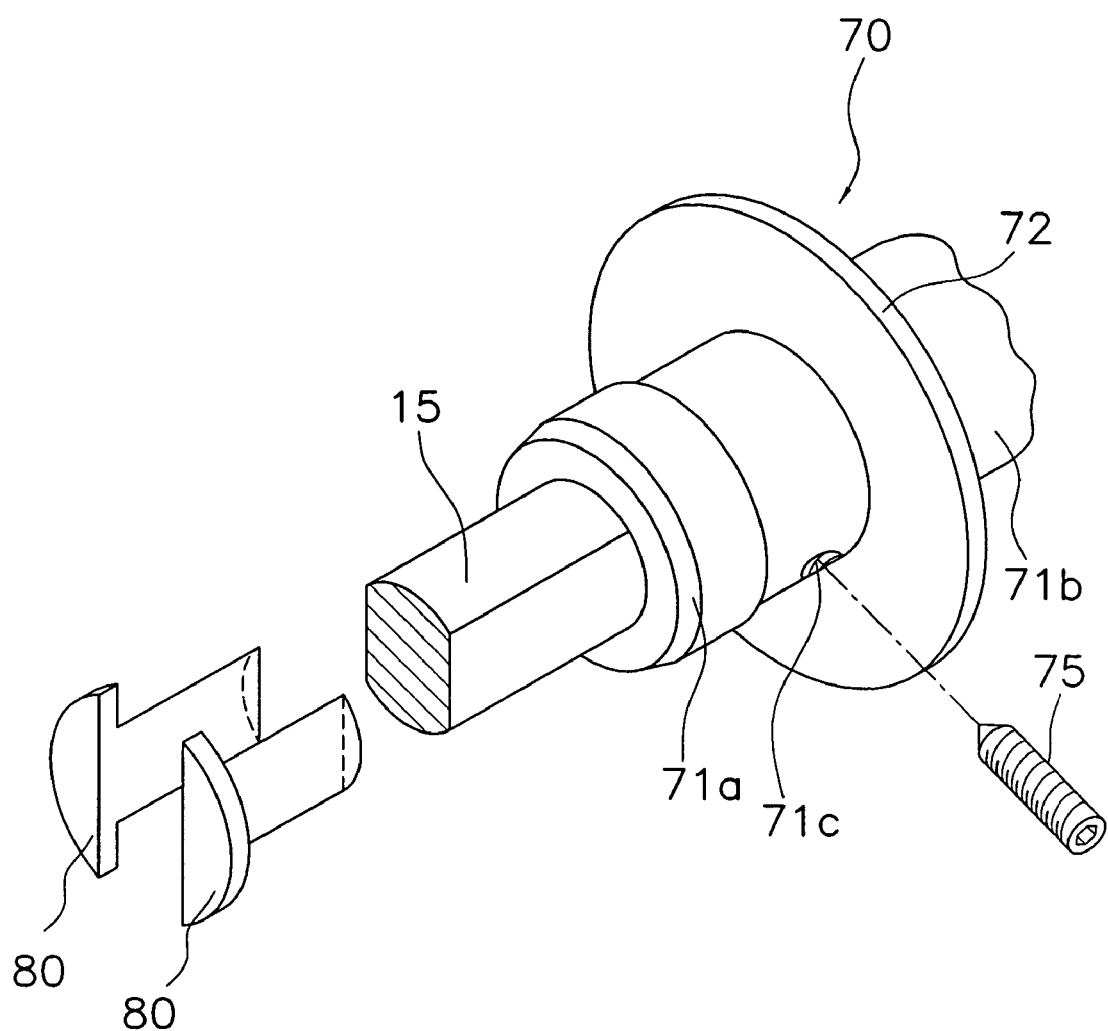
FIG. 6 is a partial perspective view of a support portion of the spool in accordance with an embodiment of the present invention.

The retaining member 70 has a through hole 71c that passes therethrough and that is formed in the first cylindrical portion 71a. The retaining member 70 is non-rotatably coupled to the spool shaft 15 by a pin member 75 (such as an Allen set-screw) that screws into a threaded portion 15a formed in the spool shaft 15. In addition, three spacer members 76 are mounted to the first cylindrical portion 71a in which the pin member 75 is mounted, in between the front side surface of the disk member 72 and the inner peripheral portion 18. Furthermore, as shown in FIG. 6, the inner peripheral surface of the retaining member 70 is formed so that its cross-section is circular, and the spool shaft 15 is formed so that its cross-section is non-circular. Spacer members 80 with a substantially semi-circular cross-section are respectively mounted in two gaps between the inner peripheral surface of the retaining member 70 and the spool shaft 15. This allows wobbling of the retaining member 70 to be prevented.

The spool and retainer are conventional components that are well known in the art. Accordingly, their structures will not be discussed or illustrated in detail herein.

Sound Producing Mechanism 90

Figure 5:
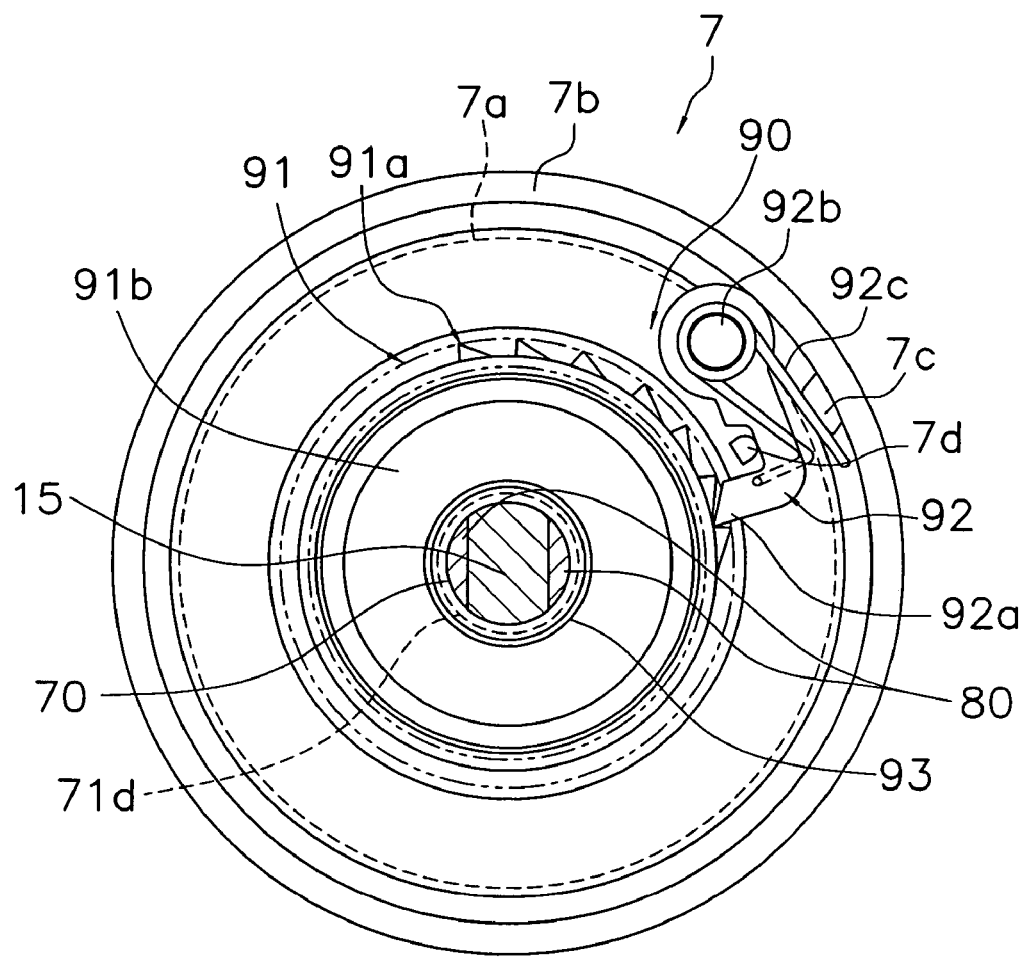
FIG. 5 is an enlarged rear cross-sectional view of the sound producing mechanism in accordance with an embodiment of the present invention.

As shown in the enlarged views of FIG. 4 and FIG. 5, the sound producing mechanism 90 includes the first sound producing portion 91 that is mounted to the reel unit by being coupled to the spool shaft 15, the second sound producing portion 92 that is mounted to the spool 4 to produce sound by repeatedly contacting the first sound producing portion 91, and the friction member 93 that restricts the rotation of the first sound producing portion 91 relative to the spool shaft 15.

As shown in FIG. 4 and FIG. 5, the first sound producing portion 91 is a closed-end cylindrical member having on its outer peripheral surface the saw-tooth portions of a ratchet wheel, and includes a plurality of saw tooth portions 91a and an attachment portion 91b. The saw tooth portions 91a are formed in a saw tooth shape circumferentially apart on an outer peripheral surface of the attachment portion 91b, so that the spool 4 can rotate only in the line releasing direction against the saw tooth portions 91a. An inner peripheral surface of the bottom portion of the attachment portion 91b is attached to the retaining member 70, which is non-rotatably mounted to the spool shaft 15. A space is kept between the second bearing 57 and the inner peripheral surface side of the cylindrical portion of the first sound producing portion 91. In other words, the inner diameter of the saw-tooth portions 91a of the first sound producing portion 91 is larger than the outer diameter of the second bearing 57.

As shown in FIG. 4 and FIG. 5, the second sound producing portion 92 includes a hook-shaped pawl member 92a that is mounted pivotably to the rear end of the bobbin portion 7a so that its front end can come into contact with the saw-tooth portions 91a, a support member 92b that pivotably supports the pawl member 92a, and a spring member 92c that urges the front end of the pawl member 92a toward the saw-tooth portions 91a. The spring member 92c has one end engaged with the boss portion 7c (see FIG. 5) that is positioned on the rear end of the bobbin portion 7a, and the other end attached to the pawl member 92a. In addition, a stopper portion 7d is positioned on the rear end of the bobbin portion 7a, and restricts excessive movement of the pawl member 92a. Here, when the spool 4 rotates in the line releasing direction, the front end of the pawl member 92a repeatedly comes into contact with the saw-tooth portions 91a and produces sound. On the other hand, when the spool 4 rotates in the line winding direction, the pawl member 92a cannot move against the saw-tooth portions 91a. Accordingly, the spool 4 cannot move against the first sound producing mechanism 91, and the first sound producing mechanism 91 rotates together with the spool 4, relative to the spool shaft 15. Therefore, the sound producing mechanism 90 does not produce a sound when the spool 4 rotates in the line winding direction.

As shown in FIG. 4 and FIG. 5, the friction member 93 is an annular elastic member such as an O-ring, and restricts the rotation of the first sound producing portion 91. The friction member 93 is disposed between the first sound producing portion 91 and the retaining member 70. The friction member 93 is mounted in the groove 71d formed in the outer periphery of the retaining member 70, and restricts the rotation of the first sound producing portion 91 by contacting the inner peripheral surface of the attachment portion 91b of the first sound producing portion 91.

As shown in FIGS. 2 and 3, the skirt portion 7b is unitarily formed with the bobbin portion 7a in a tubular shape so that the skirt portion 7b covers the cylindrical portion 30 of the rotor 3. The skirt portion 7b is formed from sheet metal that is obtained by drawing an aluminum alloy.

As shown in FIG. 3, the flange portion 8 is a circular plate member made of metal or manufactured from a hard, scratch-resistant ceramic, and is formed so as to slope forward toward the outer circumference thereof. The flange portion 8 is interposed between and fixedly held by the bobbin portion 7a and the flange fixing member 9 that screws into the threaded portion 17a of the bobbin portion 7a.

As shown in FIG. 3, the flange fixing member 9 includes a tubular threaded portion 9a, a tubular drag accommodation portion 9b, and a contact portion 9c. The threaded portion 9a screws into the threaded portion 17a of the bobbin portion 7a. The drag accommodation portion 9b is unitarily formed with the inner circumferential side of the threaded portion 9a, and includes a space in the interior thereof that can accommodate a plurality of drag plates 62 (described below) of the drag mechanism 60. The contact portion 9c is provided on the front end of the threaded portion 9a and can come into contact with the flange portion 8.

The drag mechanism 60 is mounted between the spool 4 and the spool shaft 15, and serves to apply drag force to the spool 4. The drag mechanism 60 includes a knob 61 for manually adjusting the drag force, and the plurality of drag plates 62 that are pressed toward the spool 4 by the knob 61.

Operation of Reel

Next, the operation and movement of the reel will be described.

When casting, the bail arm 44 is flipped over to the line-releasing posture. Thus, the first bail support member 40 and the second bail support member 42 pivot. In this state, the fishing rod is cast while grasping the fishing line with the index finger of the hand with which the fishing rod is held. Thus, the fishing line is released with high momentum due to the weight of the tackle. After the tackle lands in the water, when the handle 1 is rotated in the line-winding direction, the rotor 3 rotates in the line-winding direction through the rotor drive mechanism 5. Accordingly, the bail arm 44 returns to the line-winding position through a bail flipping mechanism which is not shown in the figures. As a result, the fishing line will be prevented from being released because the reverse rotation of the rotor 3 is prevented.

When the fishing line is to be wound in, the handle 1 is rotated in the line-winding direction. When this occurs, the rotation is then transmitted via the face gear 11 and the pinion gear 12 to the rotor 3, and the rotor 3 is rotated. When the rotor 3 rotates, the fishing line guided by the line roller 41 is wound around the spool 4.

When the spool 4 rotates in the line releasing direction, by, for example, the operation of the drag mechanism 60, the pawl member 92a of the second sound producing portion 92 rotates together with the spool 4, against the saw-tooth portion 91a of the first sound producing portion 91. Accordingly, the front end of the pawl member 92a repeatedly comes into contact with the saw-tooth portions 91a and produces sound. On the other hand, when the spool 4 rotates in the line winding direction, the pawl member 92a cannot move against the saw-tooth portions 91a. Accordingly, the spool 4 cannot move against the first sound producing mechanism 91, and the first sound producing mechanism 91 rotates together with the spool 4, relative to the spool shaft 15, with the friction member 93 allowing rotation of the first sound producing portion 91 against the second cylindrical portion 71b. Therefore, the sound producing mechanism 90 does not produce a sound when the spool 4 rotates in the line winding direction.

In this type of sound producing mechanism of the spool 4, the first sound producing portion 91 is formed so as to allow rotation of the spool 4 only in the line releasing direction. Here, because the first sound producing portion 91 is formed so as to allow rotation of the spool 4 only in the line releasing direction, the second sound producing portion 92 will come into contact with the first sound producing portion 91 and produce sound only when the drag mechanism 60 operates, i.e. only when the spool 4 rotates in the line releasing direction. Thus, an angler can accurately estimate the operational state of the drag mechanism 60.

OTHER EMBODIMENTS (a) Although a shallow channel spool is used in the foregoing embodiment, the present invention is not limited thereto and may be applied to spools for any sort of spinning reel. In addition, although a front drag type spinning reel is used in the foregoing embodiment, the present invention is not limited thereto and a rear drag type spinning reel may also be used. For example, the first component can be a spool shaft that restricts the rotation of the first sound producing portion, and the second component can be a reel unit on which the second sound producing portion is mounted. Here, sound is produced by relative rotation between the spool shaft and the reel unit. Since rear drag type spinning reel is well known in the art, it would be apparent to those in the art how the sound producing mechanism of the present invention is structured and functions without further explanation.

(b) Although the friction member 93 is disposed between the first sound producing portion 91 and the retaining member 70 in the foregoing embodiment, it also can be disposed anywhere between the first sound producing portion 91 and the spool shaft 15. In addition, the friction member 93 is not limited to an annular elastic member, and it can be any conventional member that can restrict relative rotation between two components between which the friction member is disposed.

(c) Although the first sound producing portion 92 includes the spring member 92c that urges the pawl member 92a toward the saw tooth portions 91a, the first sound producing portion 92 may have a configuration without the spring member 92c. In addition, the pawl member 92a may also be a tongue-shaped member made of a synthetic resin that can come into contact with the saw-tooth portions 91a.

According to the present invention, the first sound producing portion is mounted to one of the spool and reel unit so as to be rotatable relative to the second sound producing portion only when the spool rotates in the line releasing direction. Thus, the sound producing mechanism produces sound only when the spool is rotating relative to the reel unit in the line releasing direction.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-070183. The entire disclosure of Japanese Patent Application No. 2003-070183 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A sound producing mechanism for use in a spinning reel having a reel unit and a spool that is disposed around a spool shaft, a fishing line being adapted to be wound around and released from the spool, the sound producing mechanism being designed to produce sound by relative rotation between the spool and the reel unit, the spinning reel sound producing mechanism comprising:
   a first sound producing portion having
      an attachment portion mounted to the spool shaft, and
      a plurality of saw tooth portions that are formed in a saw tooth shape circumferentially apart on an outer peripheral surface of the attachment portion; and
   a second sound producing portion that is mounted to the spool, and has a front end portion that is configured to come into contact with the saw tooth portions of the first sound producing portion,
   the first sound producing portion being mounted to the spool shaft so as to be rotatable relative to the second sound producing portion and unrotatable relative to the spool shaft when the spool rotates in a line releasing direction, and unrotatable relative to the second sound producing portion and rotatable relative to the spool shaft when the spool rotates in a line winding direction.

2. The spinning reel sound producing mechanism as set forth in claim 1, further comprising
   a friction member that is disposed between the first sound producing portion and the spool shaft to restrict rotation of the first sound producing portion relative the spool shaft.

3. The spinning reel sound producing mechanism as set forth in claim 2, further comprising
   a retaining member that is non-rotatably mounted on the spool shaft and retains a bearing that is disposed on an inner peripheral side of the spool,
   wherein
   the friction member is disposed between the first sound producing portion and the retaining member.

4. The spinning reel sound producing mechanism as set forth in claim 3, wherein:
   an inner peripheral surface of the retaining member is formed so that its cross-section is circular, and the spool shaft is formed so that its cross-section is non-circular; and
   the sound producing mechanism further includes spacer members that are inserted in a gap between the inner peripheral surface of the retaining member and the spool shaft.

5. The spinning reel sound producing mechanism as set forth in claim 3, wherein
   an inner diameter of the plurality of saw tooth portions of the first sound producing portion is larger than an outer diameter of the bearing.

6. The spinning reel sound producing mechanism as set forth in claim 2, wherein
   the friction member is an annular member made of an elastic material.

7. The spinning reel sound producing mechanism as set forth in claim 1, wherein
the first sound producing portion is a closed end cylindrical member in which the saw-tooth portions are arranged on an outer peripheral surface of a cylindrical portion.

8. The spinning reel sound producing mechanism as set forth in claim 1, wherein
   the second sound producing portion includes
      a pawl member that is pivotably mounted to the spool such that a front end portion of the pawl member can come into contact with the saw tooth portions; and
      a spring member that urges the front end portion of the pawl member toward the saw tooth portions.

9. A spinning reel comprising
   a handle;
   a reel unit rotatively supporting the handle;
   a rotor rotatively supported on a front of the reel unit;
   a spool that is disposed on a front of the rotor and around a spool shaft so as to be shifted back and forth, a fishing line being adapted to be wound around and released from the spool; and
   a sound producing mechanism for producing sound by relative rotation between the spool and the reel unit, the spinning reel sound producing mechanism including:
      a first sound producing portion having
         an attachment portion mounted to the spool shaft, and
         a plurality of saw tooth portions that are formed in a saw tooth shape circumferentially apart on an outer peripheral surface of the attachment portion; and
      a second sound producing portion that is mounted to the spool and has a front end portion that is configured to come into contact with the saw tooth portions of the first sound producing portion,
   the first sound producing portion being unrotatably mounted to the spool shaft when the spool rotates in a line releasing direction and rotatably mounted to the spool shaft when the spool rotates in a line winding direction.

10. The spinning reel as set forth in claim 9, wherein
the first sound producing portion is a closed end cylindrical member in which the saw-tooth portions are arranged on an outer peripheral surface of a cylindrical portion.

11. The spinning reel as set forth in claim 9, wherein
the second sound producing portion includes
   a pawl member that is pivotably mounted to the spool such that a front end portion of the pawl member can come into contact with the saw tooth portions; and
   a spring member that urges the front end portion of the pawl member toward the saw tooth portions.

12. A spinning reel, composing:
   a handle;
   a reel unit rotatively supporting the handle;
   a rotor rotatively supported on a front of the reel unit;
   a spool that is disposed on a front of the rotor and around a spool shaft so as to be shifted back and forth, a fishing line being adapted to be wound around and released from the spool;
   a sound producing mechanism for producing sound by relative rotation between the spool and the reel unit, the spinning reel sound producing mechanism including:
      a first sound producing portion having
         an attachment portion mounted to one of the spool and the reel unit, and a plurality of saw tooth portions that are formed in a saw tooth shape circumferentially apart on an outer peripheral surface of the attachment portion, and a second sound producing portion that is mounted to the other of the spool and the reel unit and has a front end portion that is configured to come into contact with the saw tooth portions of the first sound producing portion; and a friction member that is disposed between the first sound producing portion and the one of the spool and the reel unit, to restrict rotation of the first sound producing portion relative to the one of the spool and the reel units, the first sound producing portion being unrotatably mounted to the one of the spool and the reel unit when the spool rotates in a line releasing direction and rotatably mounted to the one of the spool and the reel unit when the spool rotates in a line winding direction.

13. The spinning reel as set forth in claim 12, further comprising a retaining member that is non-rotatably mounted on the spool shaft and retains a bearing that is disposed on an inner peripheral side of the spool, wherein the first sound producing portion is coupled to the spool shaft, and the friction member is disposed between the first sound producing portion and the retaining member.

14. The spinning reel as set forth in claim 13, wherein:

an inner peripheral surface of the retaining member is formed so that its cross-section is circular, and the spool shaft is formed so that its cross-section is non-circular; and the sound producing mechanism further includes spacer members that are inserted in a gap between the inner peripheral surface of the retaining member and the spool shaft.

15. The spinning reel as set forth in claim 13, wherein an inner diameter of the plurality of saw tooth portions of the first sound producing portion is larger than an outer diameter of the bearing.

16. The spinning reel as set forth in claim 12, wherein the friction member is an annular member made of an elastic material.

* * * * *